(12) United States Patent
Johnson

(10) Patent No.: US 7,039,717 B2
(45) Date of Patent: May 2, 2006

(54) INTERNET MODEM STREAMING SOCKET METHOD

(75) Inventor: Michael Johnson, North Petaluma, CA (US)

(73) Assignee: NVIDIA Corporation, Santa Clara, CA (US)

( * ) Notice: Subject to any disclaimer, the term of this patent is extended or adjusted under 35 U.S.C. 154(b) by 843 days.

(21) Appl. No.: 09/965,952

(22) Filed: Sep. 27, 2001

(65) Prior Publication Data

US 2002/0091831 A1 Jul. 11, 2002

Related U.S. Application Data

(60) Provisional application No. 60/247,265, filed on Nov. 10, 2000.

(51) Int. Cl.
G06F 13/00 (2006.01)

(52) U.S. Cl. .................. 709/237; 709/217; 709/227; 709/250

(58) Field of Classification Search ............ 709/217, 709/219, 227, 228, 237, 245, 250
See application file for complete search history.

(56) References Cited

U.S. PATENT DOCUMENTS

| 212,889 | A | 3/1879 | Bridenthal Jr., et al. |
| 4,807,111 | A | 2/1989 | Cohen et al. ............... 364/200 |
| 4,839,851 | A | 6/1989 | Maki .......................... 364/900 |
| 5,012,489 | A | 4/1991 | Burton et al. .................. 375/8 |
| 5,056,058 | A | 10/1991 | Hirata et al. ................ 364/900 |
| 5,161,193 | A | 11/1992 | Lampson et al. ............. 380/49 |
| 5,163,131 | A | 11/1992 | Row et al. ................... 395/200 |
| 5,307,413 | A | 4/1994 | Denzer ......................... 380/49 |
| 5,426,694 | A | 6/1995 | Herbert ....................... 379/242 |
| 5,430,727 | A | 7/1995 | Callon ...................... 370/85.13 |
| 5,440,551 | A | 8/1995 | Suzuki ......................... 370/60 |
| 5,455,599 | A | 10/1995 | Cabral et al. ............... 345/133 |
| 5,485,460 | A | 1/1996 | Schrier et al. ............. 370/94.1 |
| 5,495,480 | A | 2/1996 | Yoshida ........................ 370/60 |
| 5,499,353 | A | 3/1996 | Kadlec et al. .............. 395/445 |
| 5,513,324 | A | 4/1996 | Dolin, Jr. et al. ....... 395/200.18 |
| 5,519,704 | A | 5/1996 | Farinacci et al. ......... 370/85.13 |
| 5,544,357 | A | 8/1996 | Huei ........................... 395/600 |
| 5,546,453 | A | 8/1996 | Herbert ....................... 379/242 |
| 5,566,170 | A | 10/1996 | Bakke et al. .................. 370/60 |
| 5,577,105 | A | 11/1996 | Baum et al. ................... 379/93 |
| 5,577,172 | A | 11/1996 | Vatland et al. .............. 395/114 |
| 5,577,237 | A | 11/1996 | Lin ............................. 395/555 |
| 5,581,686 | A | 12/1996 | Koppolu et al. ............ 395/340 |
| 5,596,702 | A | 1/1997 | Stucka et al. ............... 395/340 |

(Continued)

FOREIGN PATENT DOCUMENTS

AU 4595297 5/1998

(Continued)

OTHER PUBLICATIONS

Muller, Raimund, LON-das universelle Netzwerk Elektronik 22-1991.

(Continued)

Primary Examiner—Viet D. Vu
(74) Attorney, Agent, or Firm—Zilka-Kotab, PC

(57) ABSTRACT

An Internet client communicates with an Internet server such as an HTTP server or SMTP server through a TCP streaming socket on the Internet device with the Internet client. The TCP streaming sockets can be established through an Internet ready command line interface. The Internet ready command line interface includes "IR" commands that can establish, resume, release and terminate TCP sockets.

14 Claims, 5 Drawing Sheets

U.S. PATENT DOCUMENTS

| | | | | |
|---|---|---|---|---|
| 5,598,410 | A | 1/1997 | Stone | 370/469 |
| 5,619,650 | A | 4/1997 | Bach et al. | 395/200.01 |
| 5,621,434 | A | 4/1997 | Marsh | 345/145 |
| 5,625,678 | A | 4/1997 | Blomfield-Brown | 379/93 |
| 5,625,825 | A | 4/1997 | Rostoker et al. | 395/730 |
| 5,634,015 | A | 5/1997 | Chang et al. | 395/309 |
| 5,636,371 | A | 6/1997 | Yu | 395/500 |
| 5,640,394 | A | 6/1997 | Schrier et al. | 370/389 |
| 5,650,941 | A | 7/1997 | Coelho et al. | 364/514 |
| 5,663,951 | A | 9/1997 | Danneels et al. | 370/230 |
| 5,664,162 | A | 9/1997 | Dye | 345/521 |
| 5,666,362 | A | 9/1997 | Chen et al. | 370/420 |
| 5,675,507 | A | 10/1997 | Bobo, II | 364/514 |
| 5,678,060 | A | 10/1997 | Yokoyama et al. | 395/831 |
| 5,680,605 | A | 10/1997 | Torres | 395/603 |
| 5,682,534 | A | 10/1997 | Kapoor et al. | 395/684 |
| 5,687,314 | A | 11/1997 | Osman et al. | 395/200 |
| 5,696,899 | A | 12/1997 | Kalwitz | 395/200.1 |
| 5,699,350 | A | 12/1997 | Kraslavsky | 370/254 |
| 5,701,316 | A | 12/1997 | Alferness et al. | 371/53 |
| 5,727,149 | A | 3/1998 | Hirata et al. | 395/200.8 |
| 5,732,213 | A * | 3/1998 | Gessel et al. | 709/224 |
| 5,734,852 | A | 3/1998 | Zias et al. | 395/334 |
| 5,734,865 | A | 3/1998 | Yu | 395/500 |
| 5,748,905 | A | 5/1998 | Hauser et al. | 395/200.79 |
| 5,754,540 | A | 5/1998 | Liu et al. | 370/315 |
| 5,754,556 | A | 5/1998 | Ramseyer et al. | 371/10.3 |
| 5,761,281 | A | 6/1998 | Baum et al. | 379/93.29 |
| 5,778,178 | A | 7/1998 | Arunachalam | 395/200.33 |
| 5,790,546 | A | 8/1998 | Dobbins et al. | 370/400 |
| 5,790,676 | A | 8/1998 | Ganesan et al. | 380/23 |
| 5,802,287 | A | 9/1998 | Rostoker et al. | 395/200.8 |
| 5,802,306 | A | 9/1998 | Hunt | 395/200.58 |
| 5,805,816 | A | 9/1998 | Picazo, Jr. et al. | 395/200.53 |
| 5,809,235 | A | 9/1998 | Sharma et al. | 395/200.6 |
| 5,815,516 | A | 9/1998 | Aaker et al. | 371/53 |
| 5,818,935 | A | 10/1998 | Maa | 380/20 |
| 5,826,032 | A | 10/1998 | Finn et al. | 395/200.66 |
| 5,854,750 | A | 12/1998 | Phillips et al. | 364/478.04 |
| 5,870,549 | A | 2/1999 | Bobo, II | 395/200.36 |
| 5,870,622 | A | 2/1999 | Gulick et al. | 395/800.35 |
| 5,872,919 | A | 2/1999 | Wakeland | 395/200.6 |
| 5,877,764 | A | 3/1999 | Feitelson et al. | 345/347 |
| 5,894,557 | A | 4/1999 | Bade et al. | 395/200.58 |
| 5,909,546 | A | 6/1999 | Osborne | 395/200.42 |
| 5,918,051 | A | 6/1999 | Savitzky et al. | 395/683 |
| 5,920,732 | A | 7/1999 | Riddle | 395/876 |
| 5,923,892 | A | 7/1999 | Levy | 395/800.31 |
| 5,935,268 | A | 8/1999 | Weaver | 714/758 |
| 5,937,169 | A | 8/1999 | Connery et al. | 395/200.8 |
| 5,941,988 | A | 8/1999 | Bhagwat et al. | 713/201 |
| 5,943,481 | A | 8/1999 | Wakeland | 395/200.6 |
| 5,946,487 | A | 8/1999 | Dangelo | 395/705 |
| 5,966,534 | A | 10/1999 | Cooke et al. | 395/705 |
| 5,968,161 | A | 10/1999 | Southgate | 712/37 |
| 5,974,518 | A | 10/1999 | Nogradi | 711/173 |
| 5,991,299 | A | 11/1999 | Radogna et al. | 370/392 |
| 5,999,974 | A | 12/1999 | Ratcliff et al. | 709/224 |
| 6,014,699 | A | 1/2000 | Ratcliff et al. | 709/224 |
| 6,034,963 | A | 3/2000 | Minami et al. | 370/401 |
| 6,046,980 | A | 4/2000 | Packer | 370/230 |
| 6,049,857 | A | 4/2000 | Watkins | 711/207 |
| 6,061,368 | A | 5/2000 | Hitzelberger | 370/537 |
| 6,061,742 | A | 5/2000 | Stewart et al. | 709/250 |
| 6,070,198 | A * | 5/2000 | Krause et al. | 719/321 |
| 6,076,115 | A | 6/2000 | Sambamurthy et al. | 709/250 |
| 6,078,736 | A | 6/2000 | Guccione | 395/500.17 |
| 6,081,846 | A | 6/2000 | Hyder et al. | 709/250 |
| 6,092,110 | A | 7/2000 | Maria et al. | 709/225 |
| 6,092,229 | A | 7/2000 | Boyle et al. | 714/748 |
| 6,098,188 | A | 8/2000 | Kalmanek, Jr. et al. | 714/746 |
| 6,101,543 | A | 8/2000 | Alden et al. | 709/229 |
| 6,122,670 | A | 9/2000 | Bennett et al. | 709/236 |
| 6,151,625 | A | 11/2000 | Swales et al. | 709/218 |
| 6,157,955 | A | 12/2000 | Narad et al. | 709/228 |
| 6,172,980 | B1 | 1/2001 | Flanders et al. | 370/401 |
| 6,172,990 | B1 | 1/2001 | Deb et al. | 370/474 |
| 6,173,333 | B1 | 1/2001 | Jolitz et al. | 709/240 |
| 6,182,228 | B1 | 1/2001 | Boden et al. | 713/201 |
| 6,185,619 | B1 | 2/2001 | Joffe et al. | 709/229 |
| 6,198,479 | B1 | 3/2001 | Humpleman et al. | 345/329 |
| 6,208,651 | B1 | 3/2001 | Van Renesse et al. | 370/392 |
| 6,226,680 | B1 | 5/2001 | Boucher et al. | 709/230 |
| 6,230,193 | B1 | 5/2001 | Arunkumar et al. | 709/218 |
| 6,233,626 | B1 | 5/2001 | Swales et al. | 710/11 |
| 6,247,060 | B1 | 6/2001 | Boucher et al. | 709/238 |
| 6,247,068 | B1 | 6/2001 | Kyle | 709/328 |
| 6,271,752 | B1 * | 8/2001 | Vaios | 340/541 |
| 6,327,625 | B1 | 12/2001 | Wang et al. | 709/235 |
| 6,330,659 | B1 | 12/2001 | Poff et al. | 702/34 |
| 6,341,129 | B1 | 1/2002 | Schroeder et al. | 370/354 |
| 6,345,301 | B1 | 2/2002 | Burns et al. | 709/230 |
| 6,347,347 | B1 | 2/2002 | Brown et al. | 710/23 |
| 6,389,479 | B1 | 5/2002 | Boucher et al. | 709/243 |
| 6,389,537 | B1 | 5/2002 | Davis et al. | 713/187 |
| 6,393,487 | B1 | 5/2002 | Boucher et al. | 709/238 |
| 6,397,316 | B1 | 5/2002 | Fesas, Jr. | 711/200 |
| 6,427,169 | B1 | 7/2002 | Elzur | 709/224 |
| 6,430,628 | B1 | 8/2002 | Conner | 710/5 |
| 6,434,620 | B1 | 8/2002 | Boucher et al. | 709/253 |
| 6,460,080 | B1 | 10/2002 | Shah et al. | 709/224 |
| 6,530,061 | B1 | 3/2003 | Labatte | 714/807 |
| 6,609,225 | B1 | 8/2003 | Ng | 714/781 |
| 6,625,640 | B1 * | 9/2003 | Zou et al. | 709/200 |
| 6,629,141 | B1 | 9/2003 | Elzur et al. | 709/224 |
| 6,765,901 | B1 * | 7/2004 | Johnson et al. | 370/352 |
| 6,859,835 | B1 * | 2/2005 | Hipp | 709/227 |
| 2001/0021949 | A1 | 9/2001 | Blightman et al. | 709/219 |
| 2001/0023460 | A1 | 9/2001 | Boucher et al. | 709/250 |
| 2001/0027496 | A1 | 10/2001 | Boucher et al. | 709/250 |
| 2001/0029544 | A1 * | 10/2001 | Cousins | 709/233 |
| 2001/0047433 | A1 | 11/2001 | Boucher et al. | 709/250 |
| 2002/0055993 | A1 | 5/2002 | Shah et al. | 709/233 |
| 2002/0085562 | A1 | 7/2002 | Hufferd et al. | 370/392 |
| 2002/0087732 | A1 | 7/2002 | Boucher et al. | 709/250 |
| 2002/0095519 | A1 | 7/2002 | Philbrick et al. | 709/250 |
| 2002/0120899 | A1 | 8/2002 | Gahan et al. | 714/748 |
| 2002/0147839 | A1 | 10/2002 | Boucher et al. | 709/238 |
| 2002/0163888 | A1 | 11/2002 | Grinfeld | 370/235 |
| 2002/0191844 | A1 | 12/2002 | Craft et al. | 709/230 |
| 2003/0005142 | A1 | 1/2003 | Elzur et al. | 709/232 |
| 2003/0005143 | A1 | 1/2003 | Elzur et al. | 709/232 |
| 2003/0014544 | A1 | 1/2003 | Pettey | 709/249 |
| 2003/0016669 | A1 | 1/2003 | Pfister et al. | 370/392 |
| 2003/0031172 | A1 | 2/2003 | Grinfeld | 370/389 |
| 2003/0046330 | A1 | 3/2003 | Hayes | 709/201 |
| 2003/0046418 | A1 | 3/2003 | Raval et al. | 709/237 |
| 2003/0056009 | A1 | 3/2003 | Mizrachi et al. | 709/245 |
| 2003/0058870 | A1 | 3/2003 | Mizrachi et al. | 370/395.52 |
| 2003/0061505 | A1 | 3/2003 | Sperry et al. | 713/200 |
| 2003/0066011 | A1 | 4/2003 | Oren | 714/758 |
| 2003/0074324 | A1 * | 4/2003 | Kresina et al. | 705/60 |
| 2003/0084185 | A1 | 5/2003 | Pinkerton | 709/236 |
| 2003/0095567 | A1 | 5/2003 | Lo et al. | 370/466 |
| 2003/0115350 | A1 | 6/2003 | Uzrad-Nali et al. | 709/231 |
| 2003/0115417 | A1 | 6/2003 | Corrigan | 711/118 |
| 2003/0128704 | A1 | 7/2003 | Mizrachi et al. | 370/394 |
| 2003/0145101 | A1 | 7/2003 | Mitchell et al. | 709/236 |
| 2003/0145270 | A1 | 7/2003 | Holt | 714/766 |
| 2003/0167346 | A1 | 9/2003 | Craft et al. | 709/250 |
| 2003/0200284 | A1 | 10/2003 | Philbrick et al. | 709/219 |

FOREIGN PATENT DOCUMENTS

| | | |
|---|---|---|
| AU | 7364898 | 11/1998 |
| AU | 4435999 | 12/1999 |
| AU | 723724 | 9/2000 |
| AU | 0070603 | 3/2001 |
| AU | 734115 | 6/2001 |
| AU | 0741089 | 11/2001 |
| AU | 0228874 | 5/2002 |
| CA | 2265692AA | 5/1998 |
| CA | 2287413AA | 11/1998 |
| CA | 2328829AA | 12/1999 |
| CA | 2265692 C | 8/2001 |
| CN | 1237295 A | 12/1999 |
| CN | 1266512 T | 9/2000 |
| CN | 1305681 T | 7/2001 |
| TW | 447205 B | 7/2001 |
| TW | 448407 B | 8/2001 |
| WO | WO 98/21655 | 5/1998 |
| WO | WO 98/50852 | 11/1998 |
| WO | WO 99/65219 | 12/1999 |
| WO | WO 01/13583 | 2/2001 |
| WO | WO 01/28179 | 4/2001 |
| WO | WO 02/39302 | 5/2002 |
| WO | WO 02/059757 | 8/2002 |
| WO | WO 02/086674 | 10/2002 |
| WO | WO 03/021443 | 3/2003 |
| WO | WO 03/021447 | 3/2003 |
| WO | WO 03/021452 | 3/2003 |

OTHER PUBLICATIONS

Abbot, Mark B.; Peterson, Larry L., "Increasing Network Trhoguhput by Integrating Protocol Layers" IEEE 1993.
Wright, Maury, Low-Cost Control LANs Add Automation to Homes, Autos, and Offices EDN-Technology Jul. 20, 1992.
Preston, David J., "Internet Protocols Migrate To Silicon For Networking Devices" Electronic Design Apr. 14, 1997.
Chesson, Greg, "The Protocol Engine Project" Technology Focus Sep. 1987.
Chesson, Greg, "Proceedings of the Summer 1987 USENIX Conference" USENIX Association Jun. 8-12, 1987.
G. Chesson and L. Green, "XTP Protocol Engine VLSI for Real-Time LANS" EFOC/LAN Jun. 29-Jul. 1, 1968.
Wayner, "Sun Gambles on Java Chops", Bytes, Nov. 1996.
Raz, "Real Time Program Language Accelerator", WO 98/21655, May 1998.
Agrawal et al. "Architecture and Design of the Mars Hardware Accelerator", ACM 1987, pp. 101-107.
Case, "Implementing the Java Virtual Machine", Microprocessor Report, Mar. 1996.
Kitadeya et al., "Matsushita Launches Web TV Internet Connection Terminal", http://www.mei.co.jp/corp/news/official.data/data.dir/en981112-1/en981112-1.html, Nov. 1998.
IReady Product Data Sheet, Internet Tuner, undated.
Johnson et al. , "Internet Tuner", New Media News, http://www.newmedianews.com/020197/ts.sub-inettuner.html, Jan. 1997.
Kelly, T., "Cheap Internet Hardware that Fits in Everything", ZDNet, http://www.zdnet.co.uk/news/1998/44/ns-5998.html, Nov. 1998.
8802-3:2000 ISO/IEC Information Technology, http://www.computer.org/cspress/CATALOG/st01118.htm, printed Aug. 11, 2004.
INCITS: Development work conducted in t10-I/O Interface-Lower Level Sep. 30, 2002 Weber, Ralph O.
Dalton, Chris; Watson, Greg; Banks, David; Calamvokis, Costas; Edwards, Aled; Lumley, John, "Afterburner: A Network-independent card provides architectural support for high-performance protocols" IEEE Jul. 1993.
Gupta, Pankaj; McKeown, Nick, "Algorithms for Packet Classification" IEEE Network Mar./Apr. 2001.
Clark, David D.; Romkey, John; Salwen, Howard, "An Analysis of TCP Processing Overhead" IEEE 1988.
Clark, David D.; Jacobson, Van; Romkey, John; Salwen, Howard, "An Analysis of TCP Processing Overhead" IEEE Jun. 1989.
Goloi, W.K.; Behr, P. "An IPC Protocol and Its Hardware Realization For A High-Speed Distributed Multicomputer System" IEEE 1981.
Ames, Richard, "Building an Embedded Web Server from Scratch" Circuit Cellar INK Feb. 1998.
Legg, John, "Choosing and implementing an embedded TCP/IP Stack" Electronic Product Design Jan. 1999.
Meleis, Hanafy E.; Serpanos, Dimitrios, N., "Designing Communication Subsystems for High-Speed Networks" IEEE Network Jul. 1992.
Doumenis, Gr. A.; Reisis, D.I.; Stassinopoulos, G.I., "Efficient Implementation of the SAR Sublayer and the ATM Layer in High-Speed Broadband ISDN Data Terminal Adapters" IEEE 1993.
Mora, F.; Sebastia, A., "Electronic Design of a High Performance Interfacce to the SCI Network" IEEE 1998.
Eady, Fred, "Embedded Internet Part 2: TCP/IP and a 16-Bit Compiler" Embedded PC Jun. 1999.
Shivam, Piyush; Wyckoff, Pete; Panda, Dhabaleswar, "EMP: Zero-copy OS-bypass NIC-driven Gigabit Ethernet" SC2001 Nov. 2001, Denver CO, USA.
Mansour, Mohammad; Kayssi, Ayman, " FPGA-Based Internet Protocol Version 6 Router" IEEE 1998.
Smith, Jonathon M.; Traw, C. Brendan S., "Giving Applications Access to Gb/s Networking" IEEE Network Jul. 1993.
Preston, David "Intetnet Protocols Migrate to Silicon For Networking Devices" Electronic Design Apr. 14, 1997.
Ivanov-Loshkanov, V.S.; Sevast'yanov, S.F., Semenov, M. N., "Network Microprocessor Adapter" Avtmatika i Vyshislitel'naya Tekhnika vol. 17 No. 5 pp. 25-28, 1983.
Druschel, Peter; Abbot, Mark B.; Pagels, Michael A.; Peterson, Larry L., "Network Subsystem Design" IEEE Network Jul. 1993.
Huange, Jau-Hsiung; Chen, Chi-Wen, "On Performance Measurments of TCP/IP and its Device Driver" IEEE 1992.
Siegel, Martin; Williams, Mark; Robler, Georg, "Overcoming Bottlenecks in High-Speed Transport Systems" IEEE 1991.
Neufeld, Gerald W.; Ito, Mabo Robert; Goldberg, Murray; McCutcheon, Mark J.; Ritchie, Stuart, "Paralleel Host Interface for an ATM Network" IEEE Network Jul. 1993.
Maly, K.; Khanna, K.; Kukkamala, R.; Overstreet C.M.; Yerraballi, R.; Foundriat, E.C.; Madan, B., "Parallel TCP/IP For Multiprocessor Workstations" High Performance Networking, IV, 1993 IFIP.
Laskman, T.V.; Madhow, U., "Performance Analysis of Window-based Flow Control using TCP/IP:Effect of High Bandwidth Delay Products and Random Loss" High Performance Networking V. 1994 IFIP.
Ramakrishnan, K.K., "Performance Considerations in Designing Network Interfaces" IEEE Journal1993.
Camarda, P.; Pipio, F.; Piscitelli, G.; "Performance evaluating of TCP/IP implementations in end systems" IEE Proc-Computer Digital Tech. vol. 146 No. 1 Jan. 1999.
Toyoshima, Kan; Shirakawa, Kazuhiro; Hayashi, Kazuhiro, "Programmable ATM Adapter: Rapid Prototyping of Cell Processing Equipment for ATM Network" IEEE 1997.

Blumrich, Matthias A.; Dubnicku, Cezary; Felton, Edward W.; Li, Kai, "Protected, User-level DMA for the SHRIMP Network Interface" IEEE 1996.

Feldmeier, David C.; McAuley, Anthony J.; Smith, Jonathan M., Bakin, Deborah S.; Marcus, William S.; Raleigh, Thomas M., "Protocol Boosters" IEEE 1998.

Andre Zuquete, et al.; *Transparent Authentication ans Confidentiality for Stream Sockets*; 1996; IEEE Micro.

Stevens, Richard W., "TCP/IP Illustrated Volume" Addison-Wesley Professional Computing Series, undated.

Abbot, Mark B., and Peterson, Larry L., "Increasing Network Throughput by Integrating Protocol Layers" IEEE 1993.

Wright, Maury, "Low-Cost Control LANs Add Automation to Homes, Autos, and Offices" EDN Jul. 20, 1992.

Muller, Raimund, "LON—das universelle Netzwerk" Electronik 22/1991.

Rang, Michael; Tantawy, Ahmed, "A Design Methodology for Protocol Processors" IEEE 1995.

Banks, David and Prudence, Michael, "A High-Performance Network Architecture for a PA-RISC Workstation" IEEE Journal vol. II, No. 22 Feb. 1993.

Steenkiste, Peter, "A High-Speed Network Interface for Distributed-Memory Systems: Architecture and Applications" ACM Transactions on Computer Systems, vol. 15, No. 1 Feb. 1997.

Doumenis, Gr.A., Konstantoulakis, G.E., Reisis, D.Land Stassinopoulos, G.I. "A Personal Computer Hosted Terminal Adapter For The Broadband Integrated Services Digital Network and Applications" National Technical University of Athens, Greece, undated.

Womack, Lucas; Mraz, Ronald; Mendelson, Abraham, " A Study of Virtual Memory MTU Reassembly withing the PowerPC Architecture" IEEE 1997.

Steenkiste, Peter, "A Systematic Approach to Host Interface Design for High-Speed Networks" IEEE Mar. 1994.

Wittie, Larry D., Ma, Fanyuan, "A TCP/IP Communication Subsystem in Micros" IEEE 1987.

Orphanos, George; Birbas, Alexios; Petrellis, Nikos; Mountzouris, Ioannis; Malataras, Andreas, "Compensating for Moderate Effective Throughput at the Desktop" IEEE Communication Magazine Apr. 2000.

Yocum, Kenneth G.; Chase, Jeffrey S.; Gallatin, Andrew J.; Lebeck, Alvin R., Cut-Through Delivery in Trapeze: An Exercise in Low-Latency Messaging IEEE 1997.

Varada, S.; Yang, Y.; Evans, D., "Data and Buffer Management in ATM Systems" TranSwitch Corporation, undated.

Bonjour, Dominique; de Hauteclocque, Gaelle; le Moal, Jacques, "Design and Application of ATM LAN/WAN Adapters" IEEE 1998.

Kim, Chan; Jun, Jong-Jun; Park, Yeong-Ho; Lee, Kyu-Ho; Kim, Hyup-Jong, "Design and Implementation of a High-Speed ATM Host Interface Controller" Electronics and Telecommunications Research Institute, Korea, undated.

Steenkiste, Peter, "Design, Implementation, and evaluation of a Single-copy Protocol Stack" Software—Practice and Experience, vol. 28, Jun. 1998.

Traw, C. Brendan S.; Smith, Jonathan M., "Hardware/Software Organization of a High-Performance ATM Host Interface" IEEE 1993.

Nagata, Takahiko; Hosoda, Yamashita, Hiroyuki, "High-Performance TCP/IP/ATM Communication Board" NTT Information and Communication Systems Laboratories 1998.

Nagata, Takahiko; Hosoda, Yamashita, Hiroyuki, "High-Performance TCP/IP/ATM Communication Board:Driving Force for Various Multimedia Services" vol. 9, No. 6 Nov. 1997.

Jolitz, William Frederick, "High-Speed Networking: Header prediction and forward-error correction for very high-speed data transfer" Dr. Dobbs Journal, Aug. 1992.

Chiswell, Dave "Implementation Challenges for 155Mbit ATM Adapters" ISBN# 0-7803-2636-9, undated.

Wright, Maury "Intelligent Ethernet Boards" EDN Jun. 23, 1988.

Marcus, William S.; Hadzic, Ilija; McAuley, Anthony J.; Smith, Jonathan M., "Protocol Boosters: Applying Programmability to Network Infrastructures" IEEE Communications Magazine Oct. 1998.

Korablum, Deborah F., "Protocol Implementation and Other Performance Issues for Local and Metropolitan Area Networks" EEE 1988.

Dittia, Zubin D.; Parulkar, Guru M.; Jr., Jerome R. Cox, "The APIC Approach to High Performance Network Interface Design: Protect4ed DMA and Other Techniques" IEEE 1997.

Rutsche, Erich, "The Architecture of a Gb/s Multimedia Protocol Adapter" ACM SIGCOMM Computer Communication Review, undated.

Moldeklev, Kjersti; Klovning, Espen; Kure, Oivind, "The effect of end system hardware and software on TCP/IP throughput performance over a local ATM Network", undated.

Kanakia, Hermant; Cheriton, David R., "The VMP Network Adapter Board (NAB) High Performance Network Communication for Multiprocessors" ACM 1988.

Chandrammenon, Grish P.; Varghese, George, "Trading Packet Headers for Packet Processing" IEEE 1996.

Nielson, Dr. Michael J.K., "TURBOchannel" IEEE 1991.

New Media News, www. newmedianews.com/02197/ts_inettuner.html, undated.

Kelly, T. "Cheap Internet Hardware that Fits in Everything" ZDNet, www.zdnet.co.uk/news/1998/77/ns-5998.html.

Kitadeya et al. "Matsushita Launches WebTV Internet Connection Terminal" www.mei.co.jp/corp/news/official.data.dir/en981112-1/en981112-1html, undated.

Eady Product Data Sheet, Internet Tuner, undated.

Luijten, Ronald P., "An OC-12 ATM Switch Adapter Chipset" 1998 IEEE.

"Less-Numerical Algorithms", Ch. 20 p. 888-895, undated.

"Storage Networking Industry Association" iSCSI Building Blocks for IP Storage Networking, www.ipstorage.org, undated.

* cited by examiner

INTERNET MODEM STREAMING SOCKET METHOD

CROSS-REFERENCE TO RELATED APPLICATIONS

This application is related to U.S. provisional patent application Ser. No. 60/247,265, filed on Nov. 10, 2000.

TECHNICAL FIELD

The invention relates generally to Internet communication technology, and more particularly to a system and method that provide streaming socket connection between Internet client and Internet server through an Internet modem.

BACKGROUND OF THE INVENTION

A standard modem can be in either one of two modes, command mode or data mode. In a command mode, no data is passed across the modem. The modem operation is controlled using standard modem "AT" or other commands. When the modem is connection to another modem, it goes into data mode. Changing back to command mode can be done with an escape sequence.

As for any standard modem, the following guidelines are used when issuing commands:
  When using "AT" commands, start every command line (except the "A/" and "+++" commands) with an attention ("AT") code characters. Otherwise, the modem will not execute the command.
  The commands following the "AT" prefix can be uppercase, lowercase, or a combination of both.
  Always type the "AT" prefix in the same case (not "At" or "aT").
  Telephone numbers may be entered with or without punctuation.
  Commands must be terminated with a carriage-return character. This is typically ASCII 13 (0x0D). However, it can be changed by modifying the modem S-Register number 3.

Each command line to a modem has the following format (with the exception of the "A/" and "+++" commands):
  <AT><Command>{Argument}{=n}{ }

Wherein "<AT>" is the attention code, "<Command>" is a command consisting of one letter of an ampersand ("&"), percent ("%"), or backslash ("\") followed by a letter, "{Argument}" is optional information specific to the Command, and "{=n}" is used in some instance to qualify an Argument specific to the Command. The information in angle brackets ("< >") must be included as part of the command line, while information in curly braces ("{ }") may or may not be necessary as part of the command line. It is also possible to string commands together in one command line. The attention code "AT" is only required at the beginning of the command line.

In the command mode, characters received from the serial port are interpreted as commands and must follow the guidelines described above. The modem transitions from the command mode to the data mode after a successful "ATD" command or after receiving a call in auto-answer mode. To transition from the data mode to the command mode, an escape, either a sequence of characters or toggling the DTR line, must be sent to the modem. This sequence is typically "+++", however, this can be changed to another repeated character by modifying the modem S-Register number 2. Typically, a delay with no data transfer of one second before and after this escape sequence is required. This time delay can be changed by modifying the modem S-Register number 12. The "ATO" command is used to resume the data mode without having to hang-up and redial.

A separate TCP socket application is usually added to establish Internet connection once the modem is in data mode. However, it is often desirable that a TCP streaming socket can be opened on the modem so that an Internet client can directly communicate with an Internet server over the socket.

SUMMARY OF THE INVENTION

The streaming sockets technology according to this invention offers power and flexibility that are not garnered by traditional service based on batch commands excited in command mode.

A streaming socket is a highly efficient way of utilizing a TCP socket over an asynchronous or synchronous serial data channel like an RS-232 serial port without the need for complex framing or encapsulation. It allows the client device to send and receive data over a TCP socket by simply reading and writing characters on the data channel. The streaming-socket doesn't need to know beforehand how much data is going to be exchanged, it simply allows a free flowing stream of data between the TCP socket and the client over the data channel. It also incorporates the concept of a streaming socket timer that allows the streaming socket to efficiently packetize the serial data stream into TCP segments. The socket streaming timer is tunable to provide maximum efficiency when utilized from various types of data sources, whether interactive or machine driven. Streaming sockets are also an effective way to share the data channel with many TCP sockets.

An Internet modem provides full modem functionality in addition to the Internet connectivity. The interface to the Internet modem is identical to that of a standard modem. Standard "AT" modem commands can be issued to the Internet modem and the behavior is the same as it is for a standard modem.

The internet modem is an extension of the command mode and data mode idea used in standard modem. In an Internet ready modem, there are two Internet session modes besides the standard command mode and data mode. The Internet session modes are Internet session command mode and Internet session streaming socket mode. The standard command mode and data mode are same as these of a standard modem. A "T" command or an "R" command enables Internet session streaming socket mode. Once in Internet session streaming socket mode, any data sent to the Internet modem is sent across the TCP socket, and data received on the socket is sent from the modem. Internet session streaming socket mode can be terminated by the standard modem escape sequence or by toggling the DTR. Once in Internet session command mode, the last streaming socket can be resumed, or another streaming socket can be started or resumed.

The Internet modem dials up an Internet Service Provider (ISP) and uses data mode to send a username and password string to the ISP. Once the username and password have been accepted, it returns to command mode by escaping out of data mode. Once back in data mode, PPP is raised, a TCP connection is initiated and Internet session streaming socket mode is entered. The TCP transaction is completed via the streaming socket. Once completed, Internet session streaming socket mode is escaped back into Internet session command mode where the socket can be closed and more commands can be executed.

Several streaming sockets can be used at the same time by escaping out of one streaming socket and creating or entering another streaming socket.

The communication method provides a straightforward way to transmit and receive data with an HTTP server. This is not limited to HTML content because any ASCII data can be transmitted via HTTP. The use of CGI can make this a powerful tool. Alternatively, an Internet client can use the Internet modem to communicate to an SMTP server.

DETAILED DESCRIPTION OF THE INVENTION

A. The Communications Network

Figure 1:
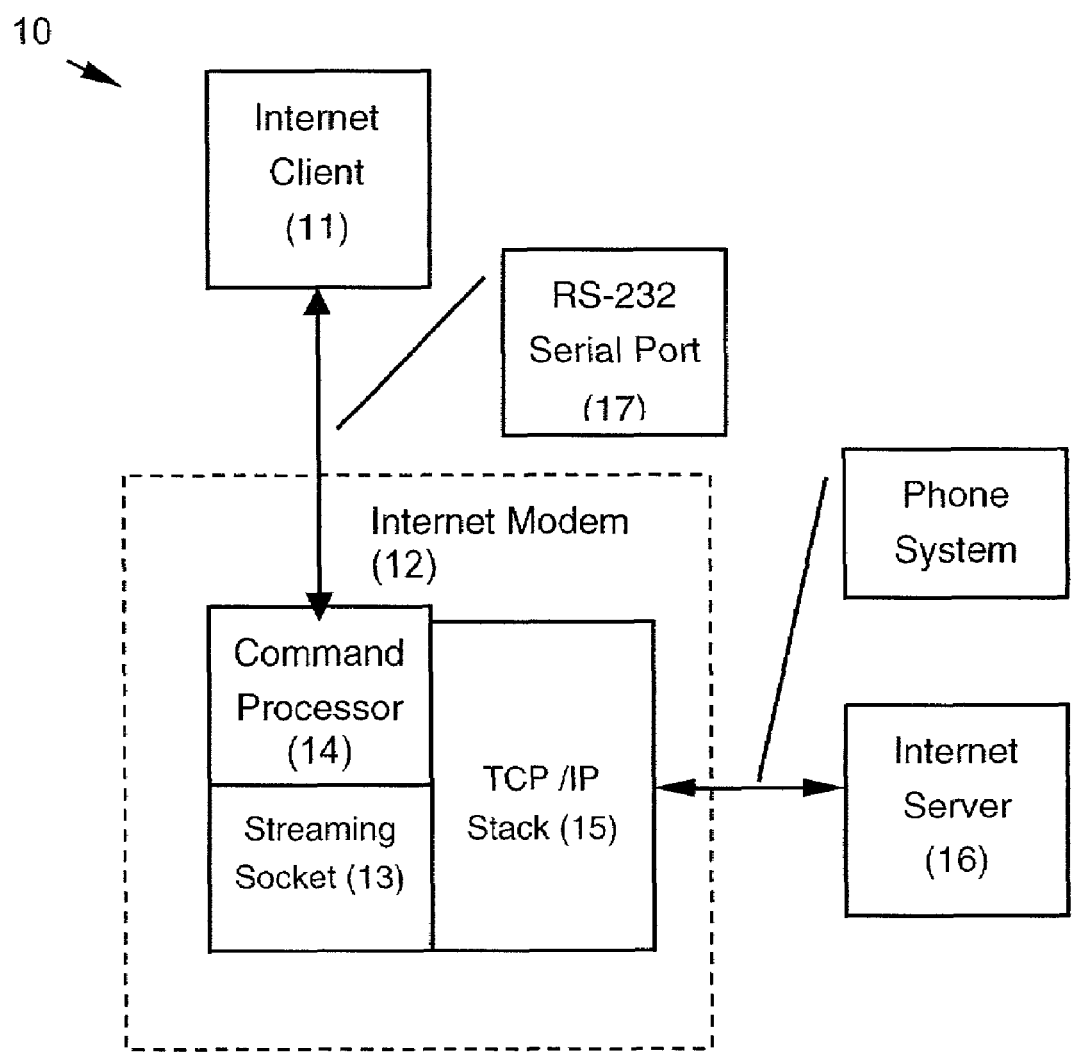
FIG. 1 is a block schematic diagram showing a computer network comprising an Internet server and an Internet client that contains an Internet modem.

FIG. 1 is a block schematic diagram that illustrates a computer network 10 comprising of an Internet client 11, an Internet modem 12, and an Internet server 18. The Internet modem 12 contains a Streaming Socket 13, a command processor 14 that interprets an Internet ready command line interface, and a TCP/IP stack 15.

The Internet client 11 communicates with the Internet modem 12 through the Internet Ready command line interface over an RS-232 serial port 17. The command processor 14 instructs the TCP/IP stack 15 to open and close sockets, send and receive data, and provide other network functionality. The command processor 14 can also switch the Internet modem to Internet session streaming socket mode where the streaming socket 13 is attached directly to an open socket in the TCP/IP stack 15 and the serial port 17. The streaming data is sent from the Internet modem 12 to the Internet server 18 through a phone system 18.

The Internet modem 12 also contains the following Internet specific S-Registers:

S0–S1: Socket 0/1 Status

These registers read the operating status of the two physical sockets in the Internet modem 12. They each contain a 3-character string that represents their current status. These registers are read-only. Any attempt to write to them will fail silently.

S2–S3: Socket 0/1 Source Port

These registers read the source port of the two physical sockets in the Internet modem 12. They are either set by a parameter in a "T" command or randomly generated if the parameter is omitted. These registers contain a character string that represents the port number. Valid port numbers are between 1 and 655535. These registers are read-only. Any attempt to write to them will fail silently.

S4: IP Address of Internet Modem

This register stores the local device IP address. If the Internet modem is used with a static IP address, this register must be set with a valid address before the "C" command is executed. If this value is not set before "C" command is executed, the Internet modem 12 negotiates a valid "IP" address during PPP negotiations. In that case, the value is only valid while PPP is active, between the execution of a "C" command and "D" command. It then shows the current negotiated IP address for the Internet modem 12. The register contains a character string that represents the IP address. The string is in the "dotted decimal" format: xxx.xxx.xxx.xxx (i.e. 192.168.2.10). When the IP address is invalid, it returns the invalid IP address: 0.0.0.0.

S5: Primary DNS Server

This register stores the primary DNS server address. If the register is not set, hostname lookups will fail. The register contains a character string that represents the IP address. The string is in the "dotted decimal" format: xxx.xxx.xxx.xxx (i.e. 192.168.2.10). When the IP address is invalid, it returns the invalid IP address: 0.0.0.0.

S6: IR Configuration Byte

This register returns or can be set with a ASCII hex byte. The byte is assembled with the following bits:
0x01=Echo in Command Modes (0=off\1=on(default))
0x02=Echo in Streaming Socket Mode (0=off\1=on(default))
0x04=Result Codes Verbose (0=off\1=on(default))
0x08=Internet Mode Escape Sequence (inband escape) (0=off\1=on(default))
0x10=Internet Modem Data Mode Escape (0=off\1=on(default))
0x80=Debug Streaming Socket Marker (0=off(default) \1=on)

S7: TCP Stream Tick Time

This register contains the TCP Stream Tick Time used to determine when to send TCP segments. Valid range is 0 through 255 units. Each unit is equal to 10 ms. Default is 50.

SE: EEPROM Read/Write/Play Slots

This register lets the user take advantage of non-volatile memory that may exist on the device. The EEPROM memory is divided up into slots of 32 characters each. The number of slots available is dependent on the system design, typically 8 or 16. Slot 0 is a special slot that is automatically executed on modem power-up and is useful to set the modem in a default state on power-up. Slots can be used for AT commands, IR commands, or for user storage. Data can be written to slots, read from slots, or sent to the IR and AT command processors for "playback". Multiple commands can be stored for playback in one slot if separated by the """ (backward single quote) character.

For example:

To store a reset modem command and DNS server init command that will execute on reset:
irse0=ATZ'irs5=192.168.1.1

To echo slot zero back:
irse0

To playback slot 1 to the IR and AT command processors:
irse1!

To store a dial string in slot 2:
irse2=ATDT9,5559874

B. The Command Line Interface

The Internet modem 12 extends the standard modem modes with two additional Internet session modes. When the Internet modem 12 is not in the Internet session modes, it behaves exactly like a standard modem, and can be in either the command mode or data mode. In the Internet session modes, the Internet modem 12 can be in either Internet session command mode or Internet session streaming socket mode. However, the Internet modem 12 does not behave exactly like a modem in these two modes. In Internet session command mode, characters received from the serial port are interpreted as commands and must follow the guidelines described above. In this case, only "IR" commands are interpreted by the command processor 14. Standard modem "AT" commands are not supported in this mode. In Internet session streaming socket mode, the Internet modem receives characters from the serial port, converts the data to Internet protocol packets, then converts them to analog signals and transmits these signals over the telephone line.

The Internet ready command line interface accepted by the command processor 14 consists of several "IR" commands. These "IR" commands follow the same guidelines as the stand modem "AT" commands:

When using "IR" commands, start every command line (except the "+++" commands) with the Internet ready ("IR") code characters.

The commands following the "IR" prefix can be uppercase, lowercase, or a combination of both.

Always type the "IR" prefix in the same case (not "Ir" or "iR").

Commands must be terminated with a carriage-return character. This is typically ASCII 13 (0x0D). However this can be changed by modifying the modem S-Register number 3.

Each command line to a modem follows the format:
<IR><Command>{Argument}

Wherein "<IR>" is the Internet ready code, "<Command>" is a command consists of one letter, and "{Argument}" is optional information specific to the Command. The information in angle brackets ("< >") must be included as part of the command line, while information in curly braces ("{ }") may or may not be necessary as part of the command line. For the "IR" commands, it is not possible to string commands together in one command line.

The Internet ready command line interface 14 includes the following "IR" commands:

"C" Command to Initialize the Connect Mode

This command starts device connection and negotiates PPP. It may take some time to return. When finished, the Internet modem transitions to Internet session command mode. Only "IR" commands can be sent to the Internet modem after this command executes. The syntax of this command is IRCn{username, password}

Wherein n can be 0 or 1 with a default value of 0. When n is set to 1, PAP authentication is used, and therefore the username and password must be provided. The username and password represents the PAP authentication user name and password respectively. The possible responses that may be returned include:

"CONNECT" (1): Connection is established
"ERROR" (4): Invalid command format
"PPP FAILED" (80): PPP negotiation failed
"D" Command to Terminate the Connect Mode This command starts device termination and device terminates PPP. When finished, the Internet modem 12 transitions to standard modem command mode. The syntax of this command is

IRD

No parameters are needed for this command. The possible responses that may be returned include:

"OK" (0): Command executed. Return to standard modem command mode

"ERROR" (4): Invalid command format
"PPP DOWN" (81): PPP is not up
"T" Command to Connect to TCP Server This command starts device connection to server through TCP socket. When finished, the Internet modem transitions to Internet session streaming socket mode. Any data sent to the serial port is sent through the open TCP socket. To return to Internet session command mode, the Internet modem must be escaped or the server must terminate the TCP connection. The syntax of this command is IRTn,<server:port>{;}

Wherein n can be 0 or 1 to specify the socket number to connect, server is the IP address or name of the server to connect to, port is the TCP port number on the server to connect to. If the last character on the command line is a semicolon, the Internet modem 12 returns to Internet session command mode rather than the Internet session streaming socket mode. The connection is still created and alive. The possible responses that may be returned include:

"OK" (0): Command executed. Return to command mode.
"CONNECT" (1): Connection is established
"ERROR" (4): Invalid command format
"PPP DOWN" (81): PPP is not up
"TCP FAILED" (82): TCP negotiation failed
"SOCKET INUSE" (85): Socket already in use
"SOCKET RESET" (86): Socket reset by peer
"R" Command to Resume Socket Connection This command resumes Internet session streaming socket mode with the selected socket. The socket must have been connected with either a "T" command with a ";" argument, or "T" command and then escaped with "+++". The Internet modem 12 transitions to Internet session streaming socket mode. To return to Internet session command mode, the Internet modem 12 must be escaped or the server 18 must terminate the TCP connection. The syntax of this command is IRRn Wherein n can be 0 or 1 to specify the socket number to resume. The possible responses that may be returned include:

"OK" (0): Command executed. Return to command mode
"CONNECT" (1): Connection resumed
"ERROR" (4): Invalid command format
"PPP DOWN" (81): PPP is not up
"SOCKET DOWN" (84): Socket not connected
"X" Command to Release Socket Connection This command closes the selected socket and releases the socket resources. The syntax of this command is IRXn Wherein n can be 0 or 1 to specify the socket number to release. The possible responses that may be returned include:

"OK" (0): Command executed
"ERROR" (4): Invalid command format
"PPP DOWN" (81): PPP is not up
"SOCKET DOWN" (84): Socket not connected
"U" Command to Allocate UDP Socket This command sets up a socket resource to allow UDP communications. The syntax of this command is IRUn,<port>

Wherein n can be 0 or 1 to specify the socket number to allocate, port is the UDP port number to listen for packets on. The possible responses that may be returned include:

"OK" (0): Command executed.
"ERROR" (4): Invalid command format.
"PPP DOWN" (81): PPP is not up.

"SOCKET BUSY" (90): Socket is already in use and must be released first.

"G" Command to get UDP Data from Socket.

This command returns a UDP datagram from socket if it exists. The syntax of this command is IRGn Wherein n can be 0 or 1 to specify the socket to check for data on. The possible responses that may be returned include:

"OK" (0)ip:port,len:[data]cr/lf: Datagram is available and returned, wherein ip is 4 bytes, port is 2 bytes, len is 2 bytes and data is len bytes "ERROR" (4): Invalid command format "PPP DOWN" (81): PPP is not up "NO DATA" (81): No data is waiting "SOCKET DOWN" (81): Socket not allocated "P" Command to put Data Out UDP Socket This command sends a UDP datagram containing desired data. The syntax of this command is IRPn, <server:port>,<len:[data]>

Wherein n can be 0 or 1 to specify the socket to send data to, server is the IP address or name of the server to send datagram to, port is the UDP port number to send datagram to, len is 2 byte to specify the length of data. The possible responses that may be returned include:

"OK" (0): Datagram was sent

"ERROR" (4): Invalid command format

"PPP DOWN" (81): PPP is not up

"NO DATA" (81): No data is waiting

"SOCKET DOWN" (81): Socket not allocated

"S" Command to Set or Show S-Register

This command is used to set and show the Internet specific S-Registers of the Internet modem 12. The registers are used to store various operating parameters of the Internet modem 12. The syntax of this command is IRSn?, IRSn=y Wherein n specifies the Register number to access, y is the new value to set the register to.

"O" Command to Turn Off Internet Session Modes

This command turns off the Internet session modes. It can not be turned back on except by reset the power. The syntax of this command is

IRO

A result code is issued from the Internet modem 12 for standard "AT" commands as well as "IR" commands. The result codes may be issued in either of two possible formats: words (the long form, also known as verbose) or numeric characters (the short form, represented by digits). The result code format is set using the "ATV" command, ATV1 (default) for words, and ATV0 for numeric characters.

Word result codes are preceded and followed by a carriage-return (typically ASCII 13 (0x0D)) and line-feed (typically ASCII 10 (0x0A)) character. These characters are defined by modem S-Registers numbers 3 and 4. Numeric character result codes are terminated by the same carriage-return character that command lines are terminated with (ASCII 13 (0x0D)).

One can modify or change the values of an S-Register from the command mode with the "ATSn=" command. One can read the current value of an S-Register from the command mode with the "ATSn?" command.

The command processor 14 interprets some standard modem "AT" commands that modify the command mode interface. These include "ATE" for setting the echo mode, "ATV" for changing the result code format, and "ATS" for changing the interface command characters. These commands affect the command mode for both the "AT" commands and the "IR" commands.

C. Connect Internet Client to Internet Server

Figure 2:
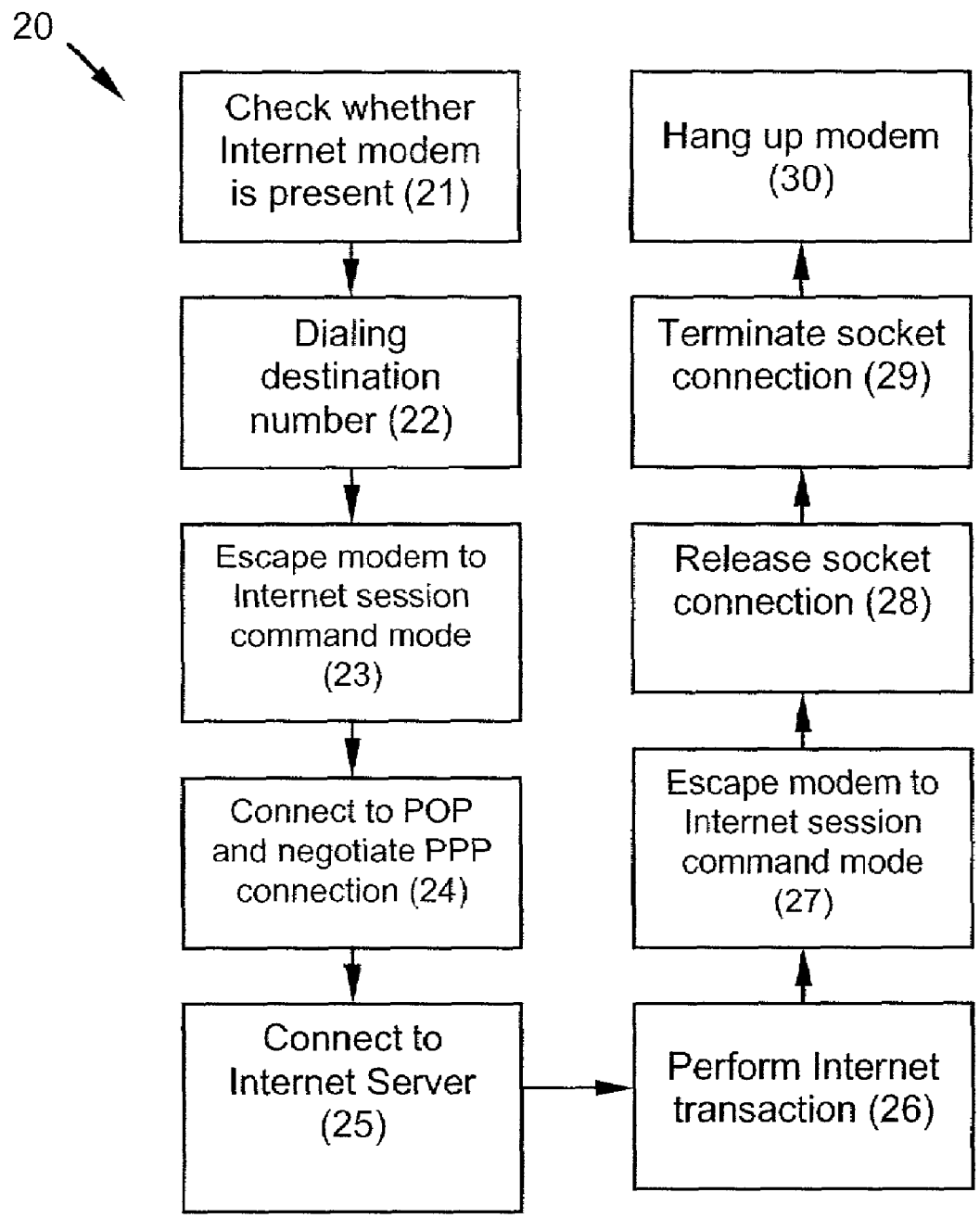
FIG. 2 is a flow diagram of a method for establishing the communication between the Internet client and the Internet server through the Internet modem.
Figure 3:
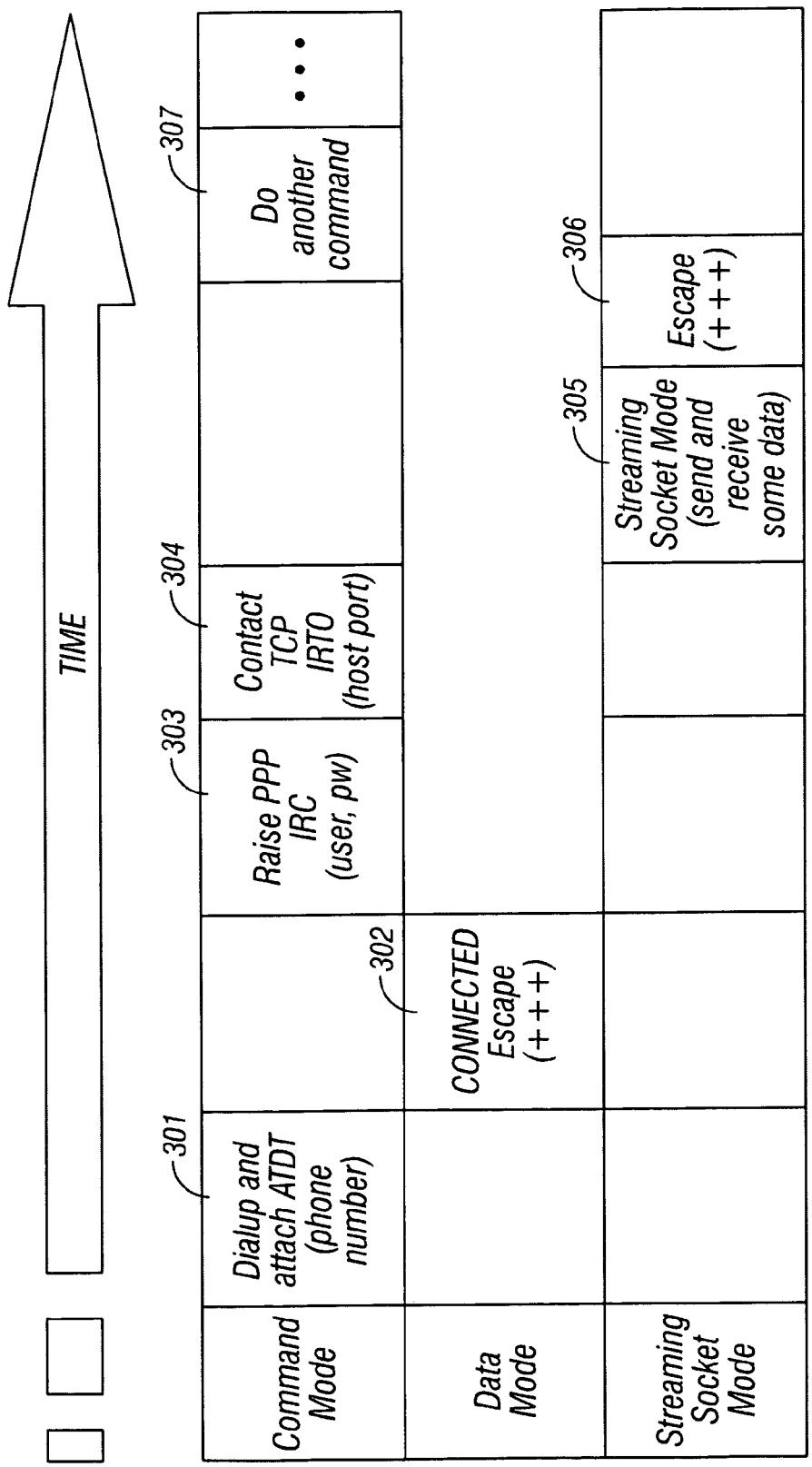
FIG. 3 is a diagram showing sample command sequence to establish a TCP connection over a streaming socket.

Now referring to FIG. 2, illustrated is a flow diagram 20 of a method for establishing the communication between the Internet client 11 and the Internet server 18 through the Internet modem 12. The method includes the following steps:

21. Checking whether an Internet modem is present.
    Command to Modem: IR
    Response from Modem: OK
22. Dialing the modem to a destination number switching modem to data mode.
    Command to Modem: ATDT14089614565
    Response from Modem: CONNECT
    The sample command is shown as 301 and the response is shown as 302 in the command sequence diagram (FIG. 3).
23. Escaping the Internet modem from data mode to command mode.
    Command to Modem: +++
    Response from Modem: OK
    The sample command is shown as part of 302 in the command sequence diagram (FIG. 3).
24. Connecting to the POP and negotiating a PPP connection using the "C" command and switching the Internet modem 12 to Internet session command mode.
    Command to Modem: IRC1username, password
    Response from Modem: CONNECT
    The sample command is shown as 303 in the command sequence diagram (FIG. 3).
25. Connecting to the Internet server 18 using the "T" command and establishing a TCP socket connection for one streaming socket.
    Command to Modem: IRT0,192.168.1.20:80,4321
    Response from Modem: CONNECT
    The sample command is shown as 304 in the command sequence diagram (FIG. 3).
26. Performing necessary Internet transactions between the Internet client 11 and the Internet server 18. This step is also shown as 305 in FIG. 3.

The Internet client 11 can post data to a CGI script on an HTTP server and receive response from the server. Alternatively, the client can connect to an SMTP server and send out emails to target email addresses.

Figure 4:
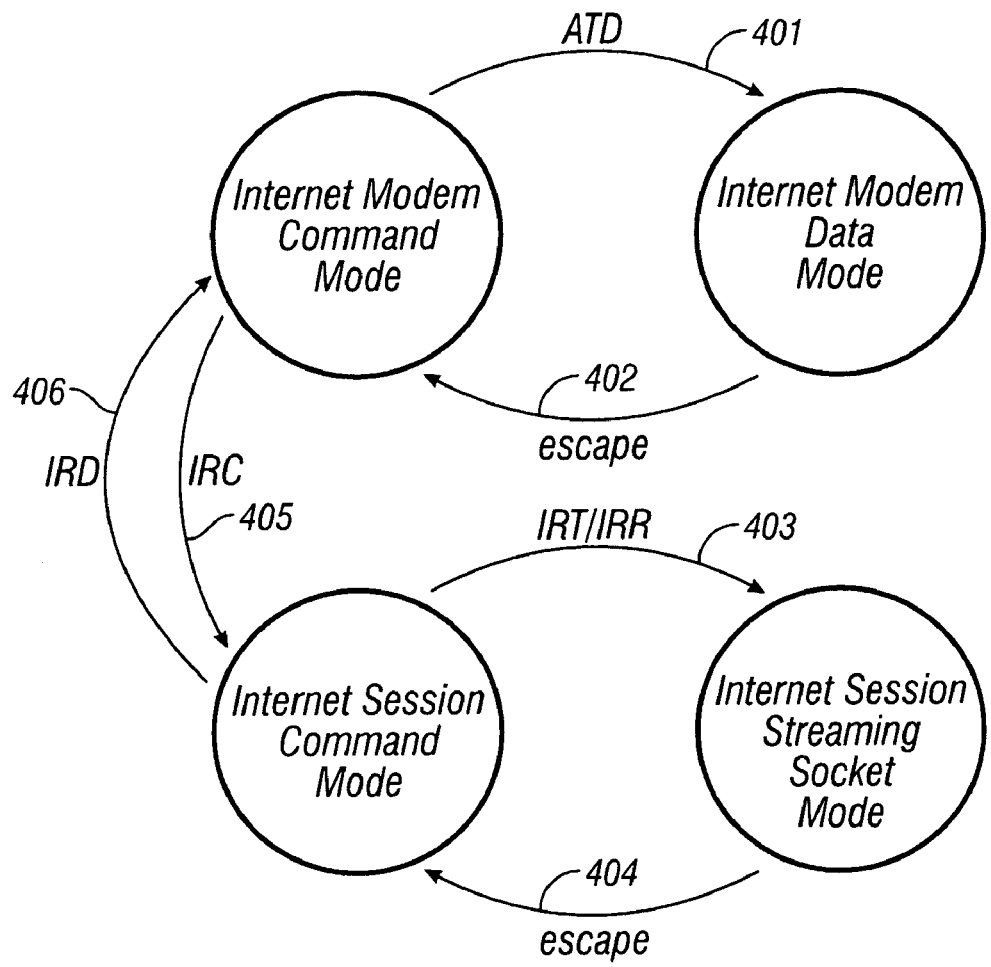
FIG. 4 is a state transition diagram for the Internet ready device.

27. Escaping the Internet modem 12 from Internet session streaming socket mode to Internet session command mode.
    Command to Modem: +++
    Response from Modem: OK
    The sample command is shown as 306 in the command sequence diagram (FIG. 3).
28. Releasing the socket connection using the "X" command.
    Command to Modem: IRX0
    Response from Modem: OK
29. Terminating the socket connection using the "D" command.
    Command to Modem: IRD
    Response from Modem: OK
30. Hanging up the Internet modem 12 using standard "ATH" modem command.
    Command to Modem: ATH
    Response from Modem: OK FIG. 4 shows the state transition diagram for the Internet modem. The Internet modem transits from Internet modem command mode to Internet modem data mode after a successful "ATD" modem command (401). It then transits back to Internet modem command mode following an Escape sequence (402). An "IRC" command negotiates PPP connection and transits the Internet modem to Internet session command mode (403) and an "IRT" or "IRR" command opens or resumes a TCP socket and transits the Internet modem to Internet session streaming socket mode (404). An escape sequence transits the Internet modem to Internet session command mode (405) and an "IRD" command transits the Internet modem to Internet modem command mode (406).

The method described above assumes the negotiating of a PPP connection is using the Password Authentication Protocol. However the method is equally applicable when negotiating of a PPP connection does not use the Password Authentication Protocol.

While escaping back to Internet session command mode, another command can be executed. This is shown as 307 in FIG. 3. One can create another TCP connection attached to other streaming sockets and perform interaction between the Internet client and a second Internet server by escaping out of one streaming socket.

Figure 5:
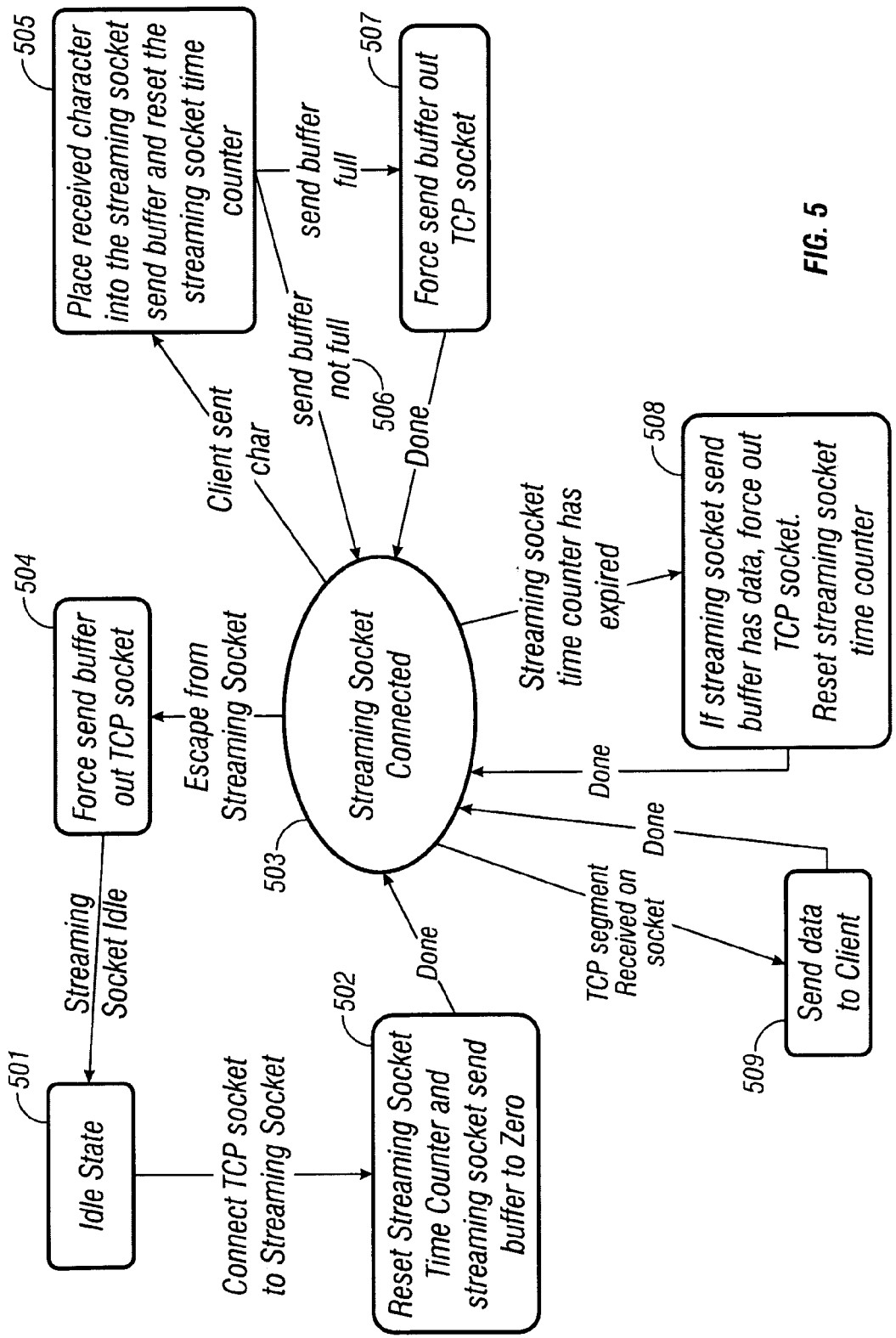
FIG. 5 is a state transition diagram showing the flow from connecting a TCP socket to a streaming socket, using the streaming socket and closing streaming socket.

FIG. 5 is a state diagram shows the flow from connecting a TCP socket to a streaming socket, using the streaming socket, and closing the streaming socket (leaving the TCP socket connected). The state transition comprises the following steps:

Step 501: Starting streaming socket at an idle state.
Step 502: When connecting TCP socket to Streaming socket, resetting streaming socket timer counter and streaming socket send buffer to zero.
Step 503: Streaming socket is now in connected mode.
Step 504: When escaping from streaming socket mode to idle state, forcing send buffer out TCP socket.
Step 505: When Internet client sending character, placing received character into streaming socket send buffer and resetting the streaming socket time counter.
Step 506: If send buffer is not full, keeping the received characters in streaming socket send buffer.
Step 507: If send buffer is full, forcing send buffer out TCP socket.
Step 508: If streaming socket send buffer has data, forcing out TCP socket and resetting streaming socket timer counter.
Step 509: When TCP segment is received on the streaming socket, sending data to Internet client.

The sending of TCP packets from the streaming socket buffer is controlled by a Streaming socket timer. The streaming socket timer is usually a value between 1 milliseconds and 5 seconds. When a client sends a character to the streaming socket the timer is reset and starts counting down. If the streaming socket doesn't receive a character before the timer expires it will send any data waiting to be sent across the TCP socket. This allows data to be packaged up into groups instead of sending one packet for each character or having to know beforehand how many characters the client will be sending. Slower timer values can provide efficiencies even for interactive use.

D. Connect to an HTTP Server

In one embodiment, the Internet server 18 is an HTTP server. A simple CGI program on the HTTP server can accept an HTTP GET with data parameters, and process the data, possibly checking for checksums included in the data, possibly parsing the data for specific information. A response can be generated on the fly and returned in the same HTTP GET transaction, possibly containing status, or configuration information. The data can then be stored in a database or simple file. This also provides a capability for dynamic formatting a presentation of the data in HTML format for a web browser. This can be done through various means, depending on the data storage and the Web tools available. The Internet client 11 established a TCP streaming socket 13 to the HTTP server 18 as described in the above section.

Once a TCP streaming socket 13 is established, the Internet client 11 may communicate with the Internet server 18 through the Internet modem 12 as illustrated in the following steps:

Performing a GET to a CGI program running on the HTTP server by the Internet client;
Sending parameter data to the CGI program by the Internet client;
Parsing the parameter data and saving it to the HTTP server by the CGI program;
Returning data from the CGI program to the Internet client 11. The data can be viewed through a PC web browser.

After the Internet transaction has been performed, the TCP streaming socket 13 can be released and the modem 12 is hang up as described in the above section.

E. Connect to a SMTP Server

The TCP streaming socket 13 also provides a straightforward way to transmit data with an SMTP server. In another embodiment, the Internet server 18 is an SMTP server. The Internet client 11 uses the Internet modem 12 to send data to a specific email address through the SMTP server.

Once a TCP streaming socket 13 is established, the Internet client 11 may communicate with the Internet server 18 through the Internet modem 12 as illustrated in the following steps:

Entering a return email address by the Internet client 11;
Entering one or more target email addresses by the Internet client 11;
Sending data to the SMTP server by the Internet client 11. The data can be retrieved from the mailbox of the target email address.

After the Internet transaction has been performed, the TCP streaming socket 13 can be released and the modem 12 is hang up as described in the above section.

Although the invention is described herein with reference to the preferred embodiment, one skilled in the art will readily appreciate that other applications may be substituted for those set forth herein without departing from the spirit and scope of the present invention.

Accordingly, the invention should only be limited by the claims included below.

What is claimed is:

1. An Internet device for communicating with an Internet server by an Internet client, said Internet device comprising:
    a command processor that accepts a command line interface;
    a TCP/IP stack that can be opened and closed, send and receive data;
    a streaming socket that can be attached to an open socket of said TCP/IP stack; and
    a plurality of Internet specific configuration elements to configure said command line interface;
    wherein said Internet device communicates with said Internet client through a serial port and said Internet device communicates with said Internet server over any of a phone system, wireless/cell/mobile phone, data network, or local area network;
    wherein said Internet device can be operated in any of the following modes:

command mode that accepts standard modem AT commands;
data mode that passes input bytes to a connected remote Internet device;
Internet session command mode that accepts said command line interface; and
Internet session streaming socket mode that transmits data to and from said Internet server;
wherein said command line interface uses a command line starting with an Internet ready code, followed by an Internet ready command, and terminated by a carriage-return character; and
wherein a result code from executing said command line can be words or numeric characters;
wherein said Internet ready command is selected from a group consisting of:
a first command that checks whether said Internet device is Internet ready enabled;
a second command that starts device connection and negotiates PPP;
a third command that starts device termination and terminates PPP;
a fourth command that starts device connection to said Internet server through TCP socket and transitions said Internet device to Internet session streaming socket mode;
a fifth command that resumes Internet session streaming socket mode with a socket that has been connected through said T command that starts device connection to said Internet server;
a sixth command that closes a socket and releases the resources allocated to the socket;
a seventh command that sets up a socket resource to allow UDP communications;
an eighth command that returns a UDP datagram from a UDP socket that has been set up;
a ninth command that sends a UDP datagram containing desired data;
a tenth command that sets and shows said Internet specific configuration elements of said Internet device; and
an eleventh command that disables the Internet ready commands processing.

2. An Internet device for communicating with an Internet server by an Internet client, said Internet device comprising:
a command processor that accepts a command line interface;
a TCP/IP stack that can be opened and closed, send and receive data;
a streaming socket that can be attached to an open socket of said TCP/IP stack; and
a plurality of Internet specific configuration elements to configure said command line interface;
wherein said Internet device communicates with said Internet client through a serial port and said Internet device communicates with said Internet server over any of a phone system, wireless/cell/mobile phone, data network, or local area network;
wherein said Internet specific configuration elements comprise:
a first and a second read-only S-Register, each of which contains a 3-character string that represents a current operating status of physical sockets in said Internet device;
a third and a fourth read-only S-Register, each of which contains a source port of physical sockets in said Internet device;
a fifth S-Register that contains an IP address of said Internet device, said IP address is statically assigned;
a sixth S-Register that contains an IP address of a primary domain name server;
a seventh S-Register that contains an ASCII Hex byte storing the configuration of Internet ready command interface;
an eighth S-Register that contains TCP Stream tick time used to determine when to send TCP segments; and
a ninth S-Register that can store AT and IR commands so that said commands can be sent to the Internet device and be executed.

3. The Internet device of claim 2, wherein said fourth S-Register contains a valid IP address established during PPP negotiation.

4. A method of communicating to an Internet server from an Internet client through an Internet device accepting a command line interface, comprising the steps of:
checking whether said Internet device supports said command line interface;
dialing said Internet device to a destination number to switch said Internet device to data mode;
escaping said Internet device from data mode to command mode;
connecting to POP and negotiating a PPP connection and switching said Internet device to Internet session command mode;
connecting to said Internet server and establishing a TCP socket connection for a streaming socket;
performing necessary Internet transactions between said Internet client and said Internet server;
escaping said Internet device from Internet streaming socket mode to Internet session command mode;
releasing said socket connection;
terminating said socket connection; and
hanging up said Internet device using standard modem command.

5. The method of claim 4, wherein said command line interface uses a command line starting with an Internet ready code, followed by an Internet ready command, and terminated by a carriage-return character, and
wherein a result code from executing said command line can be words or numeric characters.

6. The method of claim 5, wherein said Internet ready command is selected from a group consisting of:
a first command that checks whether said Internet device is Internet ready enabled;
a second command that starts device connection and negotiates PPP;
a third command that starts device termination and terminates PPP;
a fourth command that starts device connection to said Internet server through TCP socket and transitions said Internet device to Internet session streaming socket mode;
a fifth command that resumes Internet session streaming socket mode with a socket that has been connected through said T command that starts device connection to said Internet server;
a sixth command that closes a socket and releases the resource that has been allocated to said socket;
a seventh command that sets up a socket resource to allow UDP communications;
an eighth command that returns a UDP datagram from a socket that has been set up;
a ninth command that sends a UDP datagram containing desired data; and a tenth command that sets and shows said Internet specific configuration elements of said Internet device; and an eleventh command that disables the Internet ready commands processing.

7. The method of claim 5, wherein said result code of Internet ready commands can be set using a standard modem "ATV" command.

8. The method of claim 5, wherein said Internet ready code is "IR".

9. The method of claim 4 wherein Password Authentication Protocol is used in the step of negotiating PPP.

10. The method of claim 4, wherein while escaping to Internet session command mode further comprising connecting to a second Internet server and establishing a second TCP socket connection for a second socket; and performing necessary Internet transactions between said Internet client and said second Internet server over second socket.

11. The method of claim 4, wherein said streaming socket contains a send buffer and a streaming socket timer counter and said streaming socket performs state transition steps comprising starting streaming socket at an idle state;

when connecting TCP socket to Streaming socket, resetting streaming socket timer counter and streaming socket send buffer to zero;

becoming connected mode by said streaming socket;

when escaping from streaming socket mode to idle state, forcing send buffer out TCP socket;

when said Internet client sending character, placing received character into streaming socket send buffer and resetting the streaming socket timer counter;

if send buffer is not full, keeping the received characters in streaming socket send buffer;

if send buffer is full, forcing send buffer out TCP socket;

if streaming socket send buffer has data, forcing out TCP socket and resetting streaming socket timer counter; and when TCP segment is received on the streaming socket from said Internet server, sending data to said Internet client.

12. The method of claim 11, wherein said streaming socket timer is between 1 millisecond and 5 seconds.

13. The method of claim 4, wherein said Internet server is an HTTP server and the step of performing necessary Internet transactions between said Internet client and said Internet server comprises the sub-steps of:

performing a GET to a CGI program running on said HTTP server by said Internet client;

sending parameter data to said CGI program by said Internet client;

parsing said parameter data and saving it to said HTTP server by said CGI program; and returning data from said CGI program to said Internet client.

14. The method of claim 5, wherein said Internet server is an SMTP server and wherein the step of performing necessary Internet transactions between said Internet client and said Internet server comprises the sub-steps of:

entering a return email address by said Internet client;

entering one or more target email addresses by said Internet client; and sending data to said SMTP server by said Internet client.

* * * * *